(12) United States Patent
Anjo et al.

(10) Patent No.: US 7,167,937 B2
(45) Date of Patent: Jan. 23, 2007

(54) BUS SYSTEM

(75) Inventors: Kenichiro Anjo, Kanagawa (JP); Atsushi Okamura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 208 days.

(21) Appl. No.: 10/377,237

(22) Filed: Feb. 28, 2003

(65) Prior Publication Data
US 2003/0167364 A1 Sep. 4, 2003

(30) Foreign Application Priority Data
Mar. 1, 2002 (JP) ............................. 2002/055972

(51) Int. Cl.
*G06F 13/00* (2006.01)
(52) U.S. Cl. ........................................ 710/110; 710/52
(58) Field of Classification Search ................ 710/110; 700/3
See application file for complete search history.

(56) References Cited

U.S. PATENT DOCUMENTS

| | | | | |
|---|---|---|---|---|
| 5,805,837 A | * | 9/1998 | Hoover et al. .............. | 710/110 |
| 5,809,533 A | * | 9/1998 | Tran et al. .................. | 711/141 |
| 6,182,183 B1 | * | 1/2001 | Wingard et al. ............ | 710/305 |
| 6,725,307 B1 | * | 4/2004 | Alvarez et al. ............. | 710/110 |
| 6,725,313 B1 | * | 4/2004 | Wingard et al. ............ | 710/305 |
| 2004/0267992 A1 | * | 12/2004 | Stuber et al. ............... | 710/110 |

FOREIGN PATENT DOCUMENTS

| | | |
|---|---|---|
| JP | 58-136151 | 8/1983 |
| JP | 62-119654 | 5/1987 |
| JP | 6-161951 | 6/1994 |
| JP | 11-298555 | 10/1999 |
| JP | 2000-322375 | 11/2000 |

\* cited by examiner

*Primary Examiner*—Rehana Perveen
*Assistant Examiner*—Nimesh Patel
(74) *Attorney, Agent, or Firm*—Scully, Scott, Murphy & Presser, P.C.

(57) ABSTRACT

Disclosed is a bus system, which can rapidly perform various operations, that has a configuration wherein master and slave core circuits are connected to a system bus through master and slave I/F circuits.

According to the present invention, since master and slave I/F circuits perform part of the processing required for data communication between master and slave core circuits, the processing speed can be increased, while the amount of data to be exchanged by the master and slave I/F circuits and the master and slave core circuits is minimized.

14 Claims, 9 Drawing Sheets

PRIOR ART

FIG.8

PRIOR ART

FIG.9

PRIOR ART

BUS SYSTEM

BACKGROUND OF THE INVENTION

1. Field of the Invention

The present invention relates to a bus system that permits data communication, across a system bus between a master core circuit and a slave core circuit, and relates in particular to a bus system wherein a master/slave core circuit is connected, through a master/slave I/F (Interface) circuit, to a system bus.

2. Related Arts

A data processing apparatus comprising a semiconductor integrated circuit, such as a so-called ASIC (Application Specific Integrated Circuit), is so designed that various types of master core circuits and various types of slave core circuits are connected to a single system bus.

The master core circuit is an integrated circuit such as a CPU, for example, that is mainly used to perform data processing, but that is also used, as needed, to perform data communication with the slave core circuit. The slave core circuit is an integrated circuit such as a RAM (Random Access Memory), for example, and subordinately participates in the data processing performed by the master core circuit.

However, the structure of a semiconductor integrated circuit has become complicated, and currently, a master/slave core circuit, including an IP (Intellectual Property) circuit that conforms to specific, established standards, may be combined with a different system bus. In this case, to prevent data communication problems, the design of the master/slave core circuit could be changed; however, in many cases, making such a change is difficult.

Therefore, a data processing apparatus has been devised wherein a master/slave core circuit is connected to a system bus via a master/slave I/F circuit, thereby avoiding the occurrence of associated problems when, through the system bus, data communication is performed by a master/slave core circuit conforming to different standards.

[Conventional Configuration]

Figure 7:
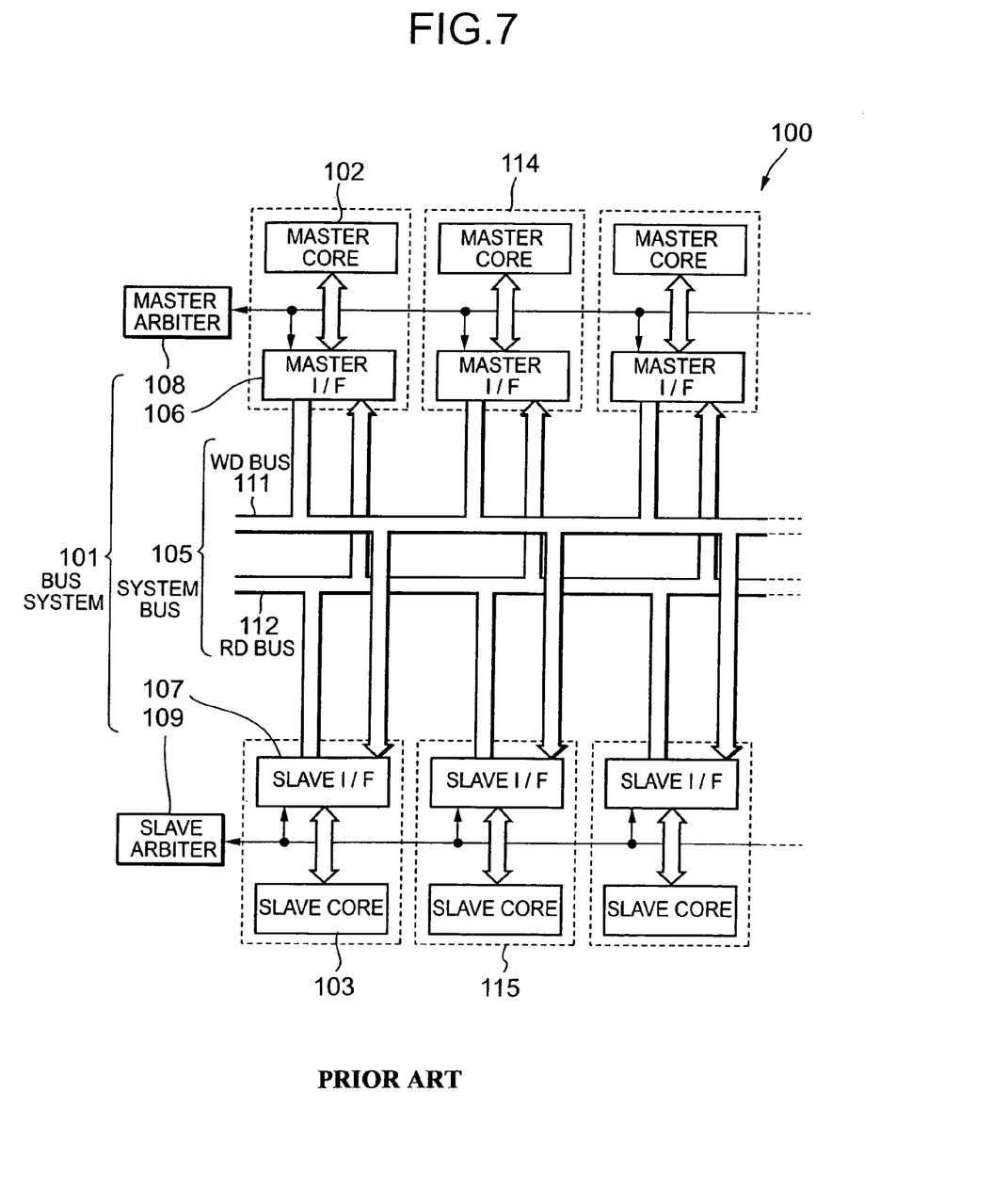
FIG. 7 is a block diagram showing the hardware configuration of a conventional data processing apparatus.

The configuration of this conventional data processing apparatus will now be described while referring to FIGS. 7 to 9. As is shown in FIG. 7, a data processing apparatus 100 comprises a bus system 101, to which multiple types of master core circuits 102 and multiple types of slave core circuits 103 are connected.

The bus system 101 includes a system bus 105, multiple master I/F circuits 106, multiple slave I/F circuits 107, a master arbiter 108 and a slave arbiter 109, and the system bus 105 includes a WD (Write Data) bus 111 and an RD (Read Data) bus 112.

The WD bus 111 serves as a control bus and a data bus along which various commands and various data output by the master core circuits 102 are transmitted, through the master I/F circuits 106, to the slave I/F circuits 107. The RD bus 112 serves as a data bus along which various data output by the slave core circuits 103 are transmitted, through the slave I/F circuits 107, to the master I/F circuits 106.

The master core circuits 102 are respectively connected, through the master I/F circuits 106, to the system bus 105, and the slave core circuits 103 are respectively connected, through the slave I/F circuits 107, to the system bus 105.

The master arbiter 108 is connected to the master I/F circuits 106, and permits one of the master I/F circuits to occupy the system bus 105. The slave arbiter 109 is connected to the slave I/F circuits 107, and permits one of the slave I/F circuits 107 to occupy the system bus 105.

The WD bus 111 and the RD bus 112 are arranged in parallel. And along the WD bus 111, commands and communication data are transmitted from the master I/F circuits 106 to the slave I/F circuits 107, while along the RD bus 112, communication data from the slave I/F circuits 107 are transmitted to the master I/F circuits 106.

To simplify the explanation, hereinafter each paired master core circuit 102 and master I/F circuit 106 is called a master block 114, and each paired slave core circuit 103 and slave I/F circuit 107 is called a slave block 115.

[Conventional Operation]

The operation of the thus arranged data processing apparatus 100 will now be explained sequentially. In this case, master data denote various data that the master core circuits 102 store separately from commands and transmit to the slave core circuits 103 as needed. Slave data denote various data that the slave core circuits 103 store and transmit to the master core circuits 102 as needed.

Figure 8:
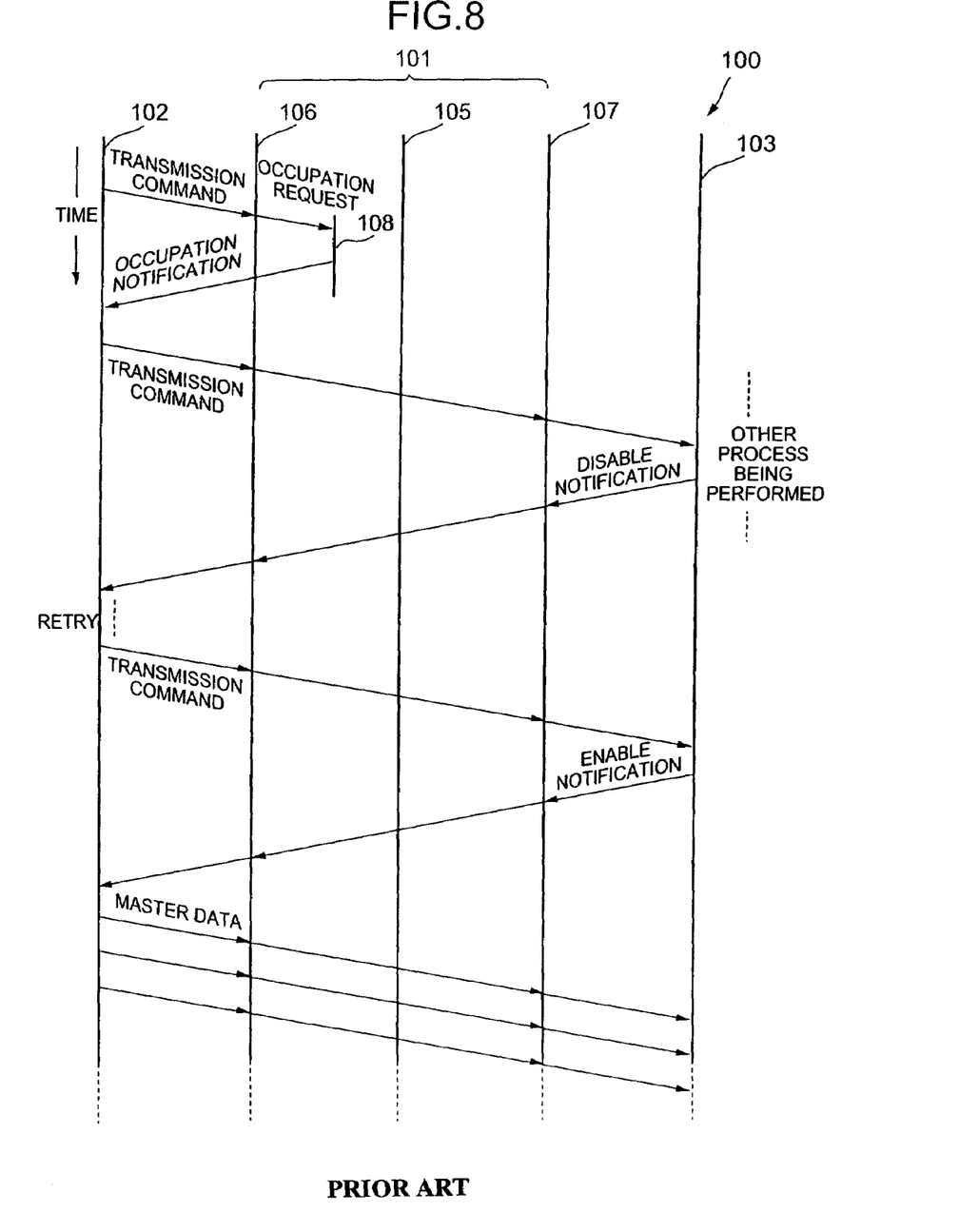
FIG. 8 is a time chart showing the processing during which the master core circuit transmits master data to the slave core circuit.

For the transmission of master data from the master core circuit 102 to the slave core circuit 103, first, as is shown in FIG. 8, the master core circuit 102 transmits, to the master I/F circuit 106, a transmission command used to instruct the slave core circuit 103 to receive the master data.

When the master I/F circuit 106 occupies the WD bus 111, upon receiving the transmission command the master I/F circuit 106 transmits this command, through the system bus 105, to the slave I/F circuit 107. When, however, the master I/F circuit 106 does not occupy the WD bus 111, the master I/F circuit 106 transmits to the master arbiter 108 a request for permission to occupy the WD bus 111.

Upon receiving the occupation request, first, the master arbiter 108 receives an occupation end from another master block 114 currently occupying the WD bus 111 and permits the master block 114 that issued the occupation request to occupy the WD bus 111. Then, after the occupation of the bus has been effected, the master arbiter 108 transmits to the master I/F circuit 106 notification that the process has been completed, and the master I/F circuit 106 transmits a like notification to the master core circuit 102.

Since the master core circuit 102 again transmits a transmission command to the master I/F circuit 106, this command is transmitted from the master I/F circuit 106 through the system 105 to the slave I/F circuit 107, and is transmitted from the slave I/F circuit 107 to the slave core circuit 103. When, at this time, the slave core circuit 103 is performing another process and can not receive the master data, the slave core circuit 103 outputs a disable notification to the slave I/F circuit 107.

The disable notification is transmitted from the slave I/F circuit 107 through the system bus 105 to the master I/F circuit 106, and is transmitted from the master I/F circuit 106 to the master core circuit 102. In this case, the master core circuit 102 performs a so-called retry process to repeat the above operation a predetermined number of times, and issues a transmission error when the number of repetitions reaches a predetermined upper limit value.

When, before a transmission error is issued, the slave core circuit 103 is ready to handle the transmission command, the slave core circuit 103 outputs an enable notification to the slave I/F circuit 107. The enable notification from the salve I/F circuit 107 is then transmitted through the system bus 15 to the master I/F circuit 106, and is transmitted from the master I/F circuit 106 to the master core circuit 102.

Then, since the master core circuit 102 transmits master data to the master I/F circuit 106, the master data is transmitted from the master I/F circuit 106, through the occupied system bus 105, to the slave I/F circuit 107, and is transmitted from the slave I/F circuit 107 to the slave core circuit 103.

Figure 9:
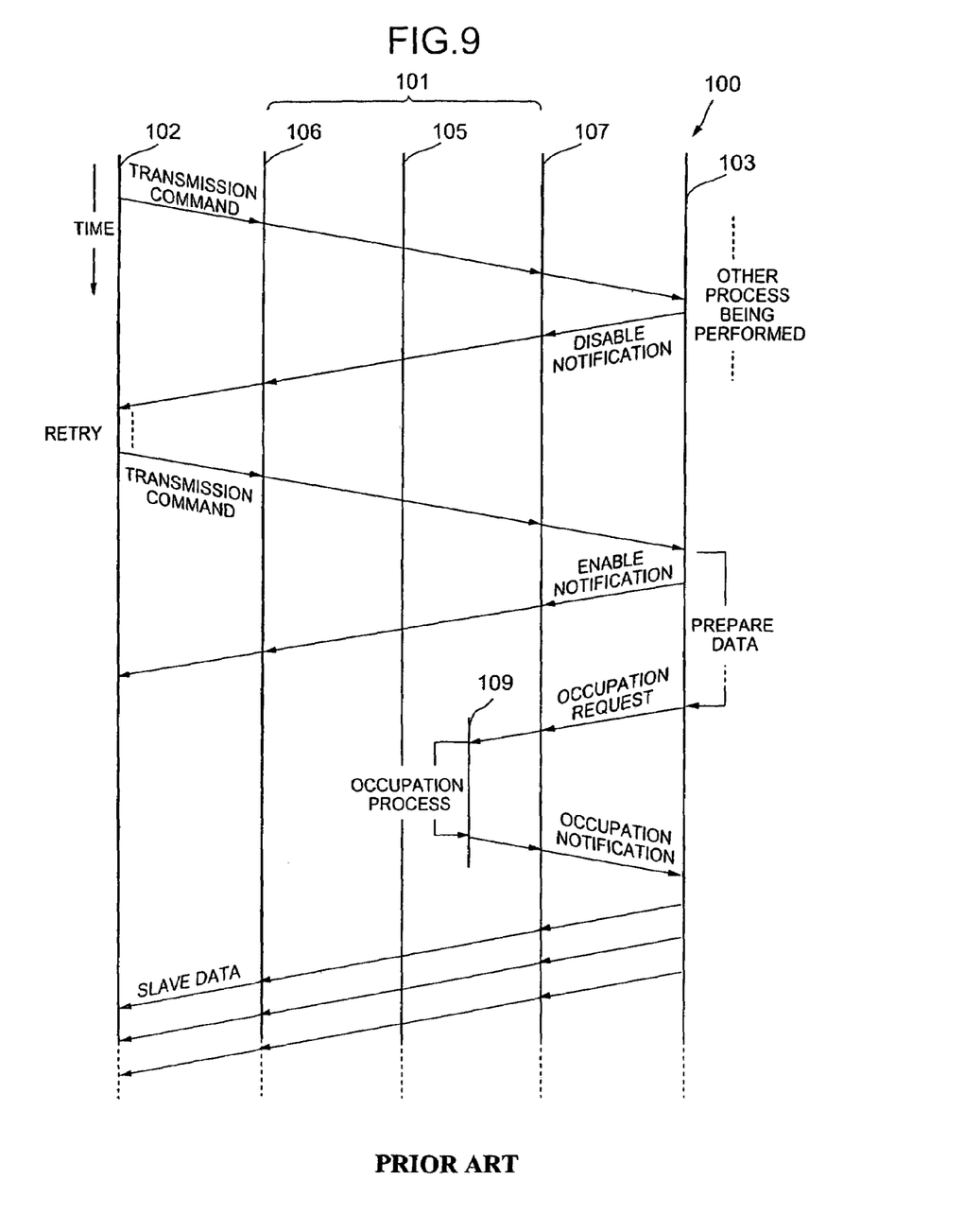
FIG. 9 is a time chart showing the processing during which the master core circuit obtains slave data from the slave core circuit.

Further, when the master core circuit 102 obtains slave data from the slave core circuit 103, as is shown in FIG. 9, the master core circuit 102 transmits to the master I/F circuit 106 an acquisition command instructing the transmission of slave data by the slave core circuit 103.

The acquisition command is transmitted through the master I/F circuit 106, the system bus 105 and the salve I/F circuit 107 to the slave core circuit 103. When, at this time, the slave core circuit 103 is performing another process and can not transmit the master data, the retry process is performed as is described above. Then, when the slave core circuit 103 enables the transmission of master data, an enable notification is transmitted through the slave I/F circuit 107, the system bus 105 and the master I/F circuit 106 to the master core circuit 102.

At this time, the slave core circuit 103 prepares slave data, and after the slave data has been prepared, the slave core circuit 103 transmits to the slave I/F circuit 107 a request for permission to occupy the RD bus 112. Since the slave I/F circuit 107 transmits the occupation request to the slave arbiter 109, the slave arbiter 109 permits the slave block 115 that issued the occupation request to occupy the RD bus 112.

When notification that occupation of the RD bus 112 has been effected is transmitted by the slave arbiter 109 through the slave I/F circuit 107 to the slave core circuit 103, the slave data from the slave core circuit 103 is transmitted through the slave I/F circuit 107, the system bus 105 and the master I/F circuit 106 to the master core circuit 102.

Since in the data processing apparatus 100 the master core circuits 102 and the slave core circuits 103 are respectively connected to the system bus 105 through the master I/F circuits 106 and the slave I/F circuits 107, master core circuits 102 and slave core circuits 103 conforming to different standards can exchange data, through the system bus 105, without any problems being encountered.

However, as is shown in FIGS. 8 and 9, when the master core circuit 102 and the slave core circuit 103 perform data communication, all the data to be exchanged must be transmitted from the master or slave core circuit 102 or 103 to the other through the master/slave I/F circuit 106 or 107. Therefore, rapid data communication is difficult.

SUMMARY OF THE INVENTION

To resolve this problem, it is one objective of the present invention to provide a bus system, the configuration of which includes master and slave I/F circuits, that facilitates the rapid performance of data communication between master and slave core circuits.

For a bus system according to the present invention, master/slave core circuits are connected to a system bus through master/slave I/F circuits, and the I/F circuits control a part of the processing required for the communication of data between the core circuits. Therefore, since not all communication data need be transmitted from the master/slave I/F circuits to the master/slave core circuits, the communication of data between the master/slave core circuits can be quickly performed by employing a configuration for which the master/slave I/F circuits are provided.

For a bus system according to a first aspect of the present invention, when a slave I/F circuit obtains, through a slave core circuit, and holds a notification for the enabling or disabling of one of various processing requests issued by a master core circuit, and when the master core circuit transmits a command through a master I/F circuit and a system bus to the slave I/F circuit, the slave I/F circuit, without notifying the slave core circuit, transmits the enable/disable notification to the master I/F circuit.

Therefore, according to the bus system of this aspect, upon receiving a command, the slave I/F circuit need not transmit the command to the slave core circuit, and also need not obtain an enable/disable notification from the slave core circuit. A savings can thus be realized in the time required to perform each of these processes.

For a bus system according to a second aspect of the invention, the master I/F circuit stores a command received from the master core circuit, and transmits this command to the slave I/F circuit. When a disable notification is received thereafter from the slave I/F circuit, the master I/F circuit does not transmit the disable notification to the master core circuit; instead, the master I/F circuit once again transmits the stored command to the slave I/F circuit.

Therefore, according to the bus system of this aspect, upon the reception of a disable notification, the master I/F circuit need not transmit the disable notification to the master core circuit, and also need not again obtain, from the master core circuit, a transmission command that is, once more, to be transmitted. A savings can thus be realized in the time required to perform each of these processes.

For a bus system according to a third aspect of the invention, the master I/F circuit extracts from a transmission command the amount of master data that the slave core circuit has received from the master core circuit. When the extracted amount of data exceeds a predetermined value, the master I/F circuit does not hold the master data temporarily. Since in this state an enable notification is returned by the slave I/F circuit, the master I/F circuit does not transmit the enable notification to the master core circuit; instead, the master I/F circuit returns to the slave I/F circuit the master data that is temporarily stored.

Therefore, for the bus system of this aspect, when the amount of master data is small, the master I/F circuit need not transmit, to the master core circuit, an enable notification received from the slave I/F circuit, and also need not, upon the reception of an enable notification, obtain master data from the master core circuit. A savings can thus be realized in the time required to perform each of these processes.

For a bus system according to a fourth aspect of the invention, the slave I/F circuit obtains and holds a command acceptance condition output by the slave core circuit. Then, upon the reception of a command from the master core circuit, the slave I/F circuit determines whether the command matches the command acceptance condition. When the command does not match the command acceptance condition, the slave I/F circuit does not transmit the command to the slave core circuit; instead, the slave I/F circuit transmits a command error to the master I/F circuit.

Therefore, according to the bus system of this aspect, a command need not be transferred from the slave I/F circuit to the slave core circuit to determine whether the command matches a command acceptance condition. Further, a command error need not be transmitted by the slave core circuit to the slave I/F circuit. A savings can thus be realized in the time required to perform each of these processes.

For a bus system according to a fifth aspect of the invention, the slave I/F circuit transmits, to the slave core circuit, an acquisition command received from the master core circuit. Then, before slave data is received from the slave core circuit, the slave I/F circuit receives a request for permission to occupy the system bus; and transmits the request to an occupation controller.

Therefore, according to the bus system of this aspect, the slave core circuit need not start a process for occupying the system bus after preparation of the slave data has been completed, and can perform the data preparation and the occupation processes in parallel. A savings can thus be realized in the time required to perform each of these processes.

DETAILED DESCRIPTION OF THE PREFERRED EMBODIMENT

[Configuration of the Embodiment]

A data processing apparatus according to the preferred embodiment of the present invention will now be described while referring to FIGS. 1 to 6. As is shown in FIG. 4, in a data processing apparatus 200 of this embodiment, as in a conventional processing apparatus, multiple master core circuits 202 and multiple slave core circuits 203 are connected to a bus system 201.

The bus system 201 includes a system bus 205, multiple master I/F circuits 206, multiple slave I/F circuits 207, a master arbiter 208 and a slave arbiter 209, corresponding to an occupation controller, and the system bus 205 includes a WD bus 211 and an RD bus 212.

The master and slave core circuits 202 and 203 are respectively connected, via the master and slave I/F circuits 206 and 207, to the system bus 205, and the master and slave arbiters 208 and 209 are respectively connected to the master and slave I/F circuits 206 and 207. Also, in this embodiment, each pair of the master and slave core circuits 202 and 203 is called a master block 214, and each pair of the master and slave I/F circuits 206 and 207 is called a slave block 215.

Figure 5:
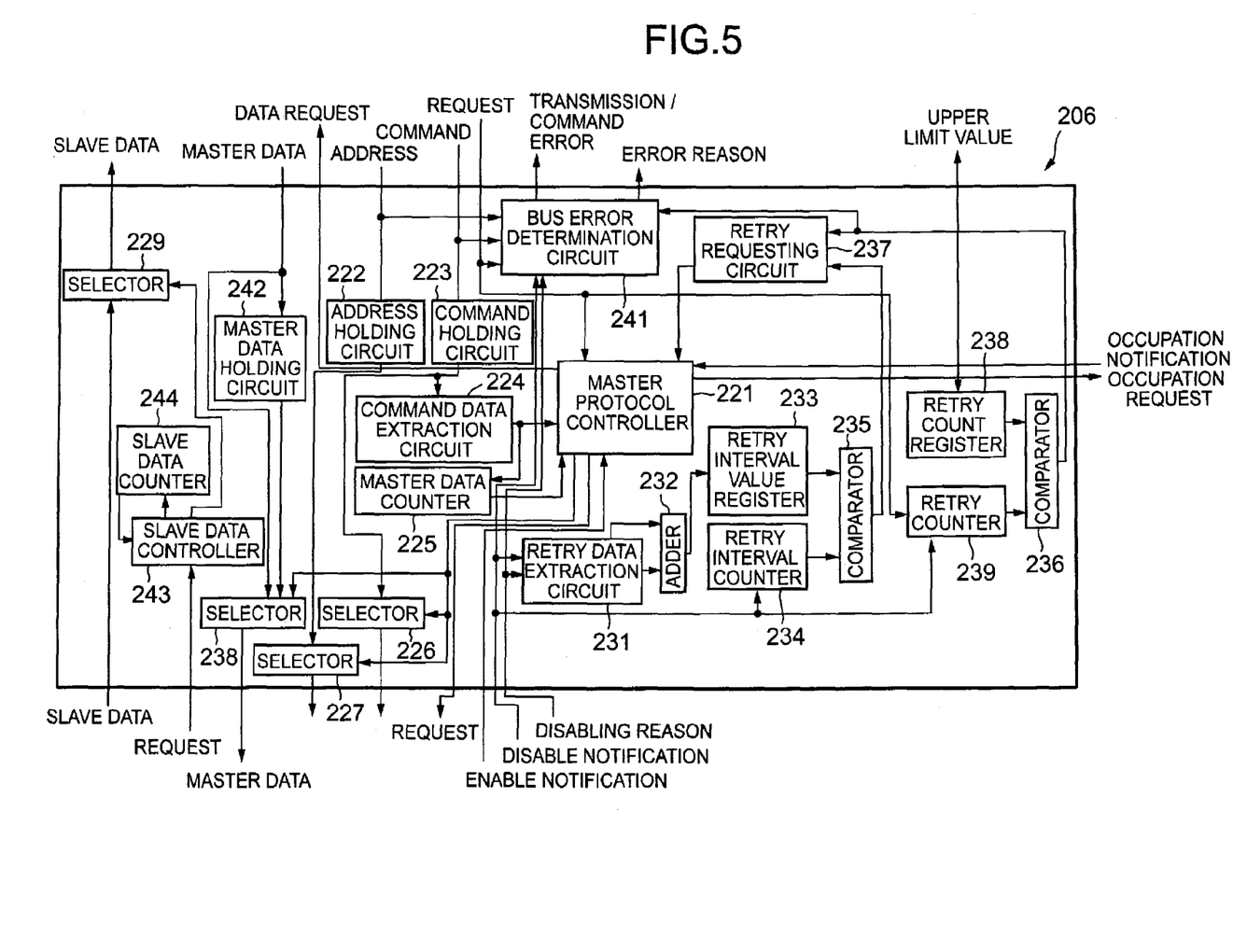
FIG. 5 is a block diagram showing the internal configuration of the master I/F circuit.

As is shown in FIG. 5, the master I/F circuit 206 includes: a master protocol controller 221; an address holding circuit 22; a command holding circuit 223, constituting a command holding unit; a command data extraction circuit 224, corresponding to one part of a size detection detector, and a master data counter 225, corresponding to another part of the size detection detector; selectors 226 to 229; a retry data extraction circuit 231; an adder 232; a retry interval register 233; a retry interval counter 234; comparators 235 and 236; a retry request circuit 237; a retry count register 238, constituting an upper limit holding unit; a retry counter 239, constituting a count accumulation unit; a bus error determination circuit 241, corresponding to an error notification unit and a cause notification unit; a master data holding circuit 242, constituting a data holding unit; and a slave data controller 243 and a slave data counter 244.

Figure 6:
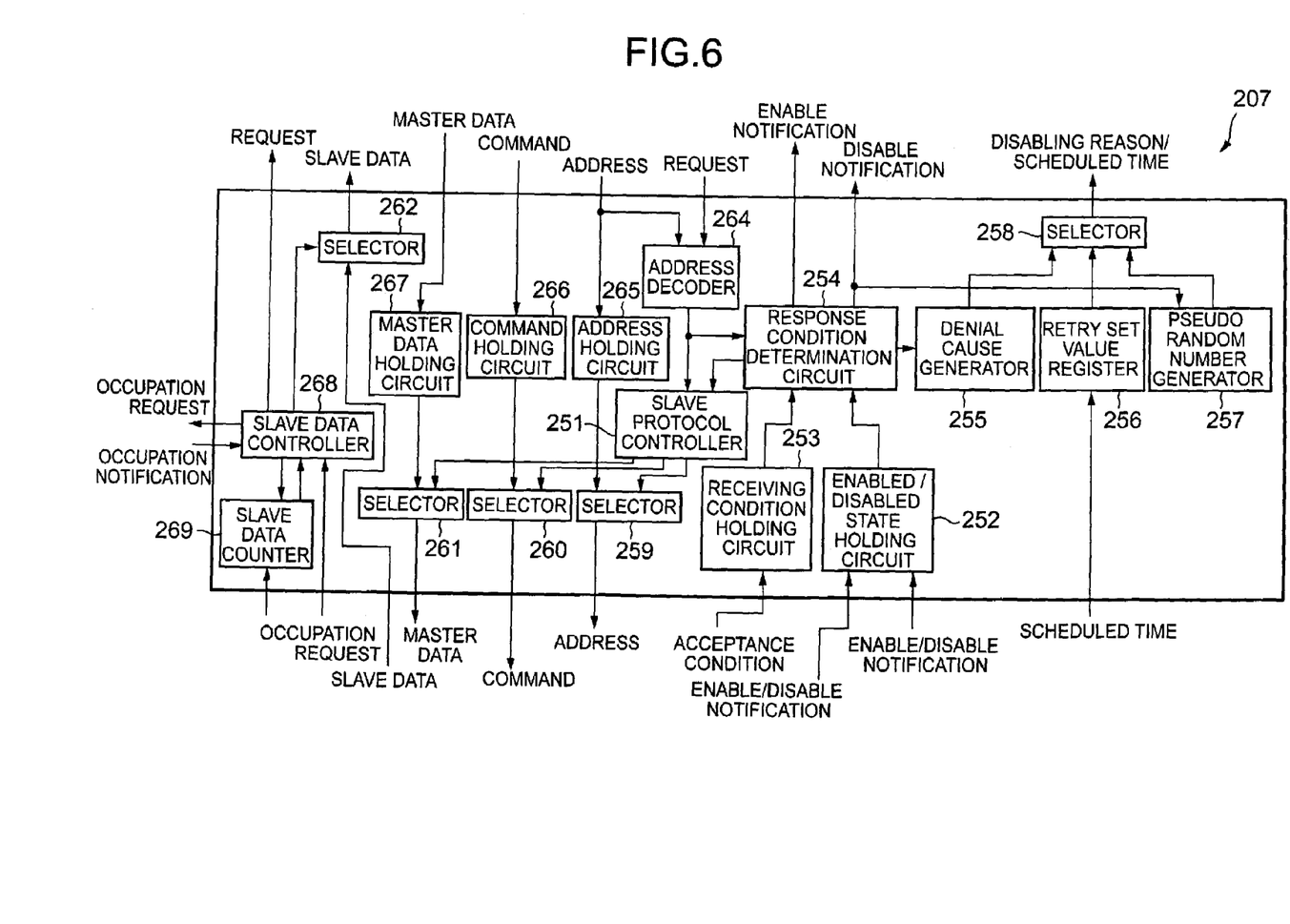
FIG. 6 is a block diagram showing the internal configuration of a slave I/F circuit.

As is shown in FIG. 6, the slave I/F circuit 207 includes: a slave protocol controller 251; an enabled or disabled state holding circuit 252, constituting an enabled or disabled state holding unit; a receiving condition holding circuit 253, constituting a condition holding unit; a response condition determination circuit 254, corresponding to a command determination and error returning unit; a denial cause generator 255, corresponding to a reason reply unit; a retry set value register 256; a pseudo random number generator 257; selectors 258 to 262; an address decoder 264; an address holding circuit 265; a command holding circuit 266; a master data holding circuit 267; a slave data controller 268, constituting an occupation request unit; and a slave data counter 269.

The master and slave protocol controllers 221 and 251 are microcomputers, and a computer program for a communication protocol, which is required for controlling the master and slave I/F circuits 206 and 207, is mounted as firmware.

When the master I/F circuit 206, in accordance with the computer program, controls the individual sections wherein the master protocol controller 221 is mounted, the master I/F circuit 206 logically includes various functions, such as a command transmission function, a transfer control function, an enable notification transfer function, a data transfer function and a data returning function.

When the slave I/F circuit 207, in accordance with the computer program, controls the individual sections wherein the slave protocol controller 251 is mounted, the slave I/F circuit 207 logically includes various functions, such as an enable/disable notification function, a time notification function, a command receiving function, and a slave data controller 268.

The command holding circuit 223 of the master I/F circuit 206 receives and holds commands, from the master core circuit 202, requesting that the slave core circuit 203 perform various processes, while the command transmission function of the master I/F circuit 206 corresponds to the function whereby the master protocol controller 221 controls the selector 226, and transmits stored commands to the slave I/F circuit 207.

The receiving condition holding circuit 253 of the slave I/F circuit 207 holds an acceptance condition, obtained from the slave core circuit 203, for a command received from the master core circuit 202, and a response condition determination circuit 254 determines whether the command received from the master core circuit 202 matches the acceptance condition. When the command does not match the acceptance condition, the response condition determination circuit 254 does not transmit the command to the slave core circuit 203; instead, it returns a command error to the master I/F circuit 206.

The enabled or disabled state holding circuit 252 of the slave I/F circuit 207 holds enable/disable notifications, obtained from the slave core circuit 203, to indicate whether various process requests output by the master core circuit 202 can be coped with. Since separate states are established wherein commands or wherein master data can not be received, enable/disable notifications corresponding to these states are stored in the enabled and disabled state holding circuit 252. These enable/disable notifications can either be transmitted as predetermined data, such as commands, or can be transmitted as the high/low states of a dedicated signal line.

The command receiving function of the slave I/F circuit 207 corresponds to the function whereby the slave protocol controller 251 controls the selector 260. And when a command matching an acceptance condition is received from the master core circuit 202 while an enable notification is stored in the enabled or disabled state holding circuit 252, the command is transferred to the slave core circuit 203.

The enable/disable notification function of the slave I/F circuit 207 corresponds to the function whereby the slave protocol controller 251 controls the response condition determination circuit 254. Upon the reception of a command from the master I/F circuit 206, the enable/disable notification function does not transmit the command to the slave core circuit 203; instead, it returns the enable/disable notification held by the enabled and disabled status holding circuit 252.

The retry set value register 256 of the slave I/F circuit 207 holds the scheduled time, obtained as the number of clocks, whereat the recovery of the slave core circuit 203, from the disabled to the enabled state, is to be effected. The time notification function of the slave I/F circuit 207 corresponds to the function whereby the slave protocol controller 251 controls the selector 258, and returns the scheduled time when the disable notification is returned to the master I/F circuit 206.

The retry interval register 233 of the master I/F circuit 206 holds the scheduled time returned with the disable notification by the slave I/F circuit 207, and the retry interval counter 234 counts the time that has elapsed since the disable notification was received. Then, when a time period corresponding to the scheduled time has elapsed, the comparator 235 transmits a notification to this effect to the retry request-circuit 237.

The transfer control function of the master I/F circuit 206 corresponds to a function whereby the master protocol controller 221 controls the selector 226 in accordance with a signal output by the retry request circuit 237. When the disable notification and the scheduled time are returned by the slave I/F circuit 207, the transfer control function does not transmit data to the master core circuit 202; instead, it waits until the time period corresponding to the scheduled time has elapsed and again transmits the stored transmission command.

The retry count register 238 of the master I/F circuit 206 holds the upper limit count, obtained from the master core circuit 202, for the repetitive transmissions of the transmission command, and the retry counter 239 holds the transmission count for the transmission command. Then, when the transmission count corresponds to the upper limit count, the comparator 236 transmits a notification to this effect to the retry request circuit 237 and the bus error determination circuit 241.

The denial cause generator 255 of the slave I/F circuit 207 returns to the master I/F circuit 206, through the selector 258, a command error and the reason for the error, and a disable notification and the reason for issuing the notification.

The denial cause generator 255 of the slave I/F circuit 207 can add, to the reason for issuing the disable notification to be returned to the master I/F circuit 206, correction data that the master block 214 can use to resolve the command error. For example, when the slave block 215 will accept only a four byte command, a field of "four bytes" can be added as correction data to the reason for issuing the disable notification.

The bus error determination circuit 241 of the master I/F circuit 206 transmits, to the master core circuit 202, the error notification received with the command error, and also transmits a transmission error, the disable notification and the reason for the disabling in accordance with a notification signal of the comparator 236.

The command data extraction circuit 224 and the master data counter 225 of the master I/F circuit 206 extract, from the transmission command, the amount of the master data from the master core circuit 202 to the slave core circuit 203. Under the control of the master protocol controller 21, the master data holding circuit 242 temporarily holds the amount of master data smaller than a predetermined amount, such as one burst.

In the data processing apparatus 200 of this embodiment, the master I/F circuit 206 is provided for each of the master core circuits 202, and the storage capacity of the master data holding circuit 242 corresponds to the minimum unit of master data output by the master core circuit 202 that is connected to the master I/F circuit 206.

The enable notification transfer function of the master I/F circuit 206 corresponds to a predetermined function of the master protocol controller 221. And when the enable notification is returned from the slave I/F circuit 207 while master data are not being temporarily held in the master data holding circuit 242, the enable notification transfer function transmits the enable notification to the master core circuit 202.

The data transfer function of the master I/F circuit 206 corresponds to a function whereby the master protocol controller 221 controls the selector 228. The data transfer function transfers, to the slave core circuit 203, the master data that are output by the master core circuit 202 upon the reception of the enable notification.

The data returning function of the master I/F circuit 206 corresponds to a function whereby the master protocol controller 221 controls the selector 228. When the enable notification is returned from the slave I/F circuit 207 while master data are being temporarily held by the master data holding circuit 242, the data returning function does not transmit data to the master score circuit 202; instead, it returns the master data that are being temporarily held.

The slave data controller 268 of the slave I/F circuit 207 notifies the slave arbiter 209 when a request for occupying the system bus 205 is received from the slave core circuit 203.

[Operation in the Embodiment]

Figure 1:
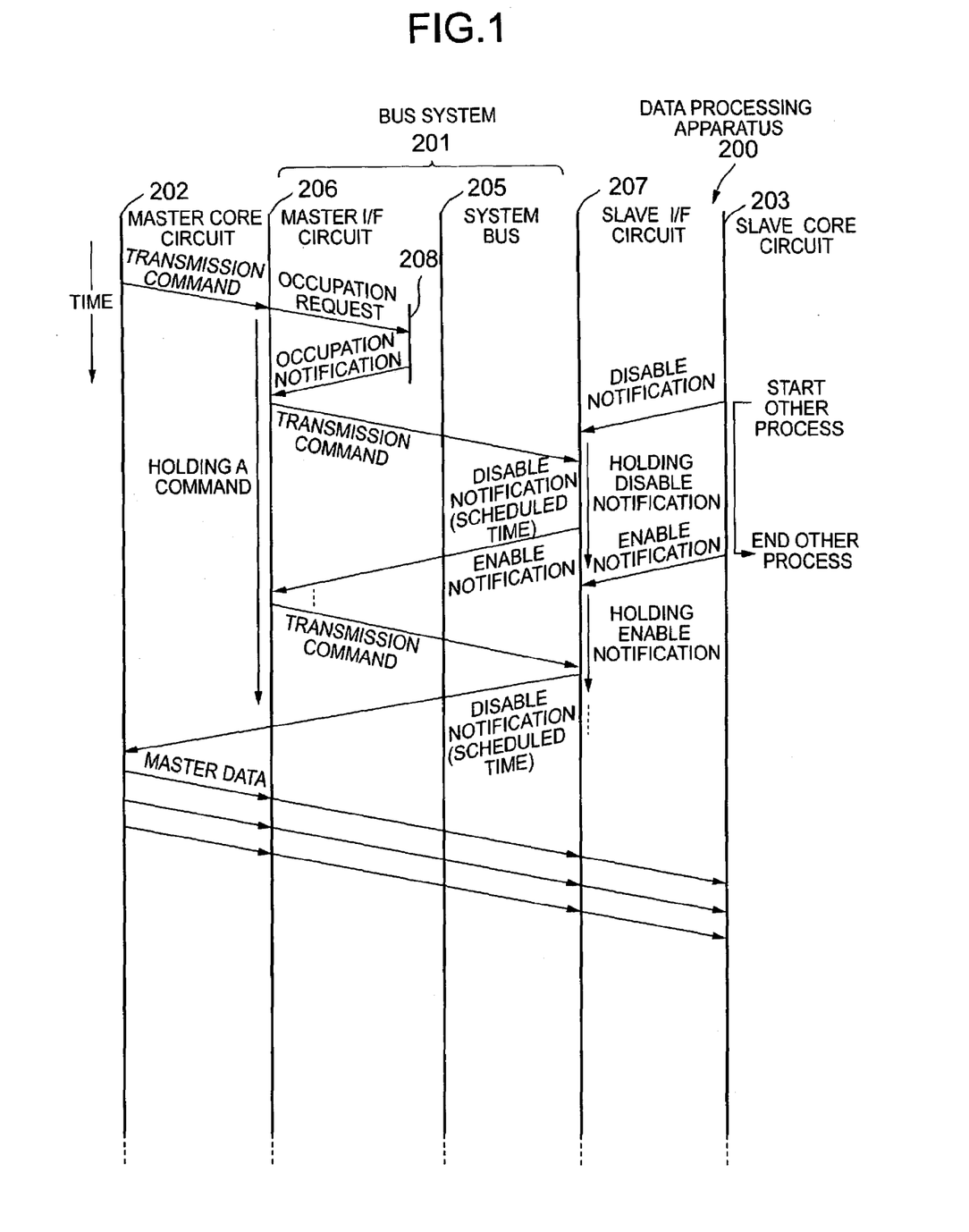
FIG. 1 is a time chart for a data processing apparatus according to one embodiment of the present invention wherein a master core circuit transmits master data to a slave core circuit.
Figure 2:
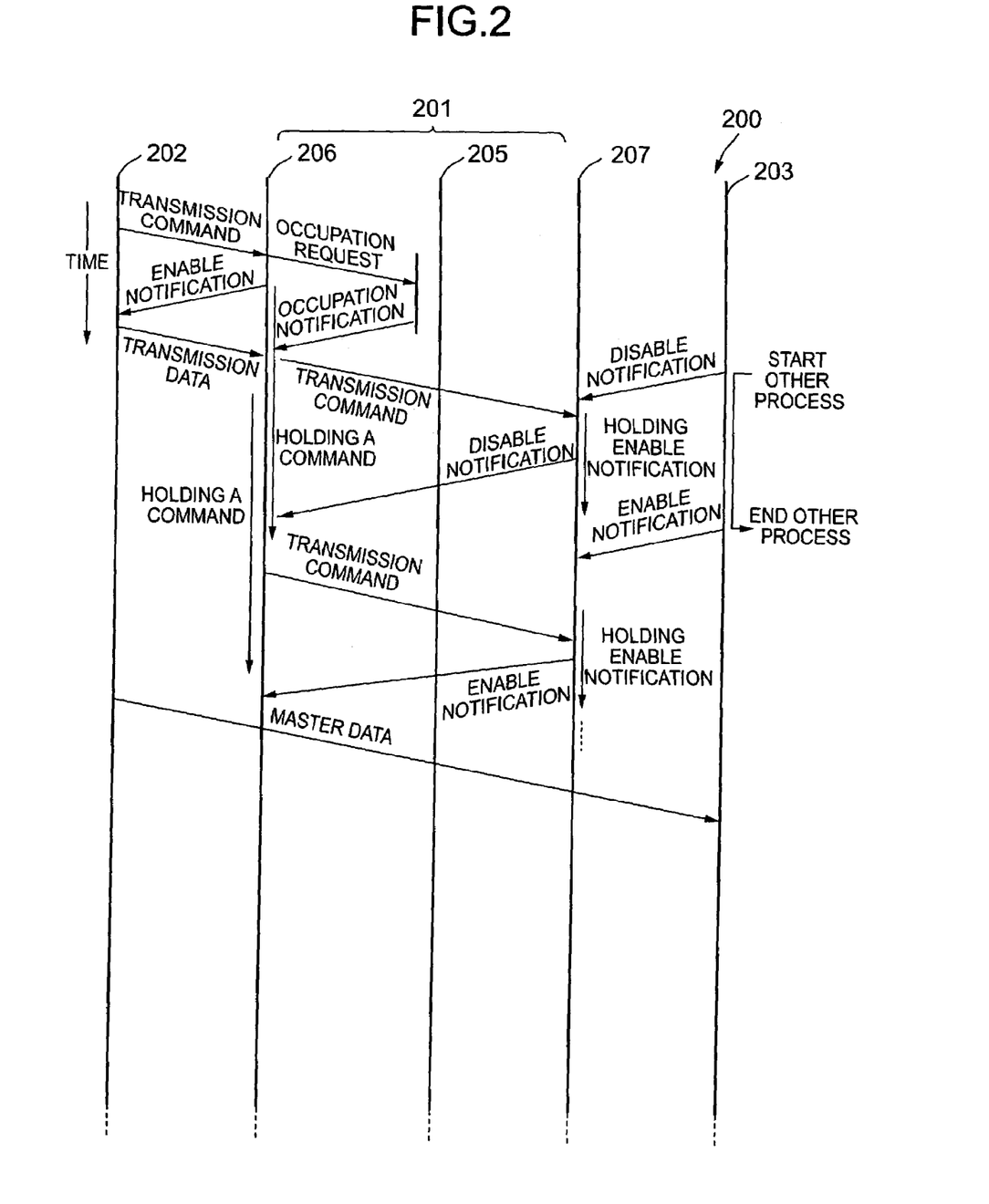
FIG. 2 is a time chart showing the processing during which a transmission command output by the master core circuit is held by a master I/F circuit.

The operations performed by the data processing apparatus 200 of this embodiment having the above configuration will now be described sequentially. First, as is shown in FIGS. 1 and 2, for each process request received from the master core circuit 202, the slave core circuit 203 outputs to the slave I/F circuit 207, in real time, an enable/disable notification, status data representing the current operating status of the slave core circuit 203. Thereafter, the slave I/F circuit 207 holds the thus obtained enable/disable notification until it is updated.

With a disable notification, the slave core circuit 203 transmits to the slave I/F circuit 207 a reason for the disabling, such as "performing another process", and the number of clocks that represents a scheduled time whereat the circuit 207 will be prepared to handle the requested process. Therefore, the slave I/F circuit 207 holds not only the disable notification but also the reason for the disabling and the scheduled time.

Further, upon the activation of the data processing apparatus 200, the slave core circuit 203 outputs an acceptance condition for an available command to the slave I/F circuit 207. Therefore, the slave I/F circuit 207 also holds the acceptance condition obtained from the slave core circuit 203.

Upon the activation of the data processing apparatus 200, the master core circuit 202 outputs, to the master I/F circuit 206, an upper limit count for repetitive command transmissions. Thereafter, the upper limit count obtained from the master core circuit 202 is held by the master I/F circuit 206.

In this state, when the master core circuit 202, as in the conventional data processing apparatus 100, transmits master data to the slave core circuit 203, the master core circuit 202 transmits a transmission command to the master I/F circuit 206. The master I/F circuit 206 then transmits to the master arbiter 208 a request for permission to occupy the WD bus 211, and receives from the master arbiter 208 an occupation notification.

However, in process that differs from that of the conventional data processing apparatus 100, the master I/F circuit 206 holds the transmission command received from the master core circuit 202 and detects the amount of the master data received from the master command. When the detected data size is greater than one burst, which is the maximum size that can be held, upon receiving a completion notification for the occupation of the WD bus 211, the master I/F circuit 206, as is shown in FIG. 1, does not transmit this notification to the master core circuit 202; instead, it transmits the stored transmission command to the slave I/F circuit 207 through the system bus 205.

The slave I/F circuit 207 then determines whether the received transmission command matches the acceptance condition that has been stored. When the transmission command does not match the acceptance command, the slave I/F circuit 207 does not transmit this command to the slave core circuit 203; instead, it returns a command error to the master I/F circuit 206 (not shown).

At this time, since the slave I/F circuit 207 returns a command error and the reason for the error to the master I/F circuit 206, the master I/F circuit 206 transmits the received command error and the error cause to the master core circuit 202. Upon receiving the command error, the master core circuit 202 ascertains that the transmission command has been rejected by the slave block 215, and upon receiving the reason for the error, ascertains the cause of the error. Thereafter, the master core circuit 202 performs a predetermined process, such as the retransmission of an appropriate command.

Further, when the transmission command matches the acceptance condition, the slave I/F circuit 207 does not transmit the received transmission command to the slave core circuit 203; instead, it returns the held enable/disable notification to the master I/F circuit 206 through the system bus 205.

When the slave core circuit 203 can not receive the transmission command because the slave core circuit 203, for example, is currently performing another process, the slave I/F circuit 207 returns the disable notification to the master I/F circuit 206. Therefore, the master I/F circuit 206 does not transmit the received disable notification to the master core circuit 202; instead, using the transmission command that has been held, it repeats a retry process a predetermined number of times.

At this time, since in addition to the disable notification the slave I/F circuit 207 returns the scheduled time to the master I/F circuit 206, the master I/F circuit 206 waits time period represented by the scheduled time to elapse and then repeats the transmission of the transmission command as a retry process.

In addition, the slave I/F circuit 207 returns to the master I/F circuit 206 the disable notification and the reason for the disabling. Thus, when the number of the retry process repetitions corresponds to a predetermined upper limit count, the master I/F circuit 206 transmits to the master core circuit 202 a transmission error, along with the disable notification and the reason for the disabling that were received.

Upon receiving the transmission error, the master core circuit 202 ascertains that the transmission command has been rejected by the slave block 215, and upon receiving the disable notification and the reason for the disabling, ascertains the cause of the error. Thus, in accordance with the cause of the error, the master core circuit 202 performs, for example, a predetermined recovery process or an interrupt process. Further, when correction data are added to the reason for the disabling, the master core circuit 202 can also retransmit an appropriate command in accordance with the correction data.

When the slave core circuit 203 is prepared to receive the transmission command before a transmission error has occurred, the slave core circuit 203 transmits to the slave I/F circuit 207, in real time, an enable notification that the slave I/F circuit 207 employs to update the stored disable notification to an enable notification.

Under these conditions, when a transmission command from the master I/F circuit 206 is received by the slave I/F circuit 207, the slave I/F circuit 207 does not transmit the received command to the slave core circuit 203; instead, it returns the stored enable notification to the master I/F circuit 206 through the system bus 205.

The master I/F circuit 206 then transmits the received enable notification to the master core circuit 202, and master data, output by the master core circuit 202, are transmitted through the master I/F circuit 206 and the system bus 205 to the slave I/F circuit 207, and are further transmitted from the slave I/F circuit 207 to the slave core circuit 203.

After the transmission of the master data, the master I/F circuit 206 transmits to the master arbiter 208 a cancellation notification for the occupation of the WD bus 211, and thereupon, the master arbiter 208 cancels the occupied state of the WD bus 211.

As is described above, when the master I/F circuit 206 extracts from a transmission command the amount of the master data received from the master core circuit 202, and) when the detected data size is smaller than one burst, which is the maximum size that can be held, as is shown in FIG. 2, the master I/F circuit 206 transmits the stored transmission command through the system bus 205 to the slave I/F circuit 207, and immediately returns the enable notification to the master core circuit 202, regardless of the reply received from the slave block 215.

Then, when the master core circuit 202 transmits the one burst of master data to the master I/F circuit 206, the master I/F circuit 206 holds the received master data. Under these conditions, when the master I/F circuit 206 receives the disable notification from the slave I/F circuit 207, the master I/F circuit 206 does not transmit the disable notification to the master core circuit 202; instead, while maintaining the master data, it repeats the retry process a predetermined number of times using the transmission command that has been stored.

Then, upon receiving the enable notification from the slave I/F circuit 207, the master I/F circuit 206 does not transmit the enable notification to the master core circuit 202; instead, it transmits the stored master data to the slave block 215 through the system bus 205.

When the master I/F circuit 206 holds the one burst of master data output by the master core circuit 202, the master core circuit 202 can be released from the data transmission process, and can perform another process. Further, when the number of times whereat the master I/F circuit 206 holding the master data has repeated the retry process corresponds to the upper limit count, the transmission error is transmitted to the master core circuit 202 and the data held in the master I/F circuit 206 are reset.

Therefore, in the data processing apparatus 200 of this embodiment, when the one burst of master data output by the master core circuit 202 are held in the master I/F circuit 206, the master core circuit 202 maintains the master data until the master I/F circuit 206 transmits a transmission end notification. As a result, the loss is prevented of master data that are to be transmitted.

Figure 3:
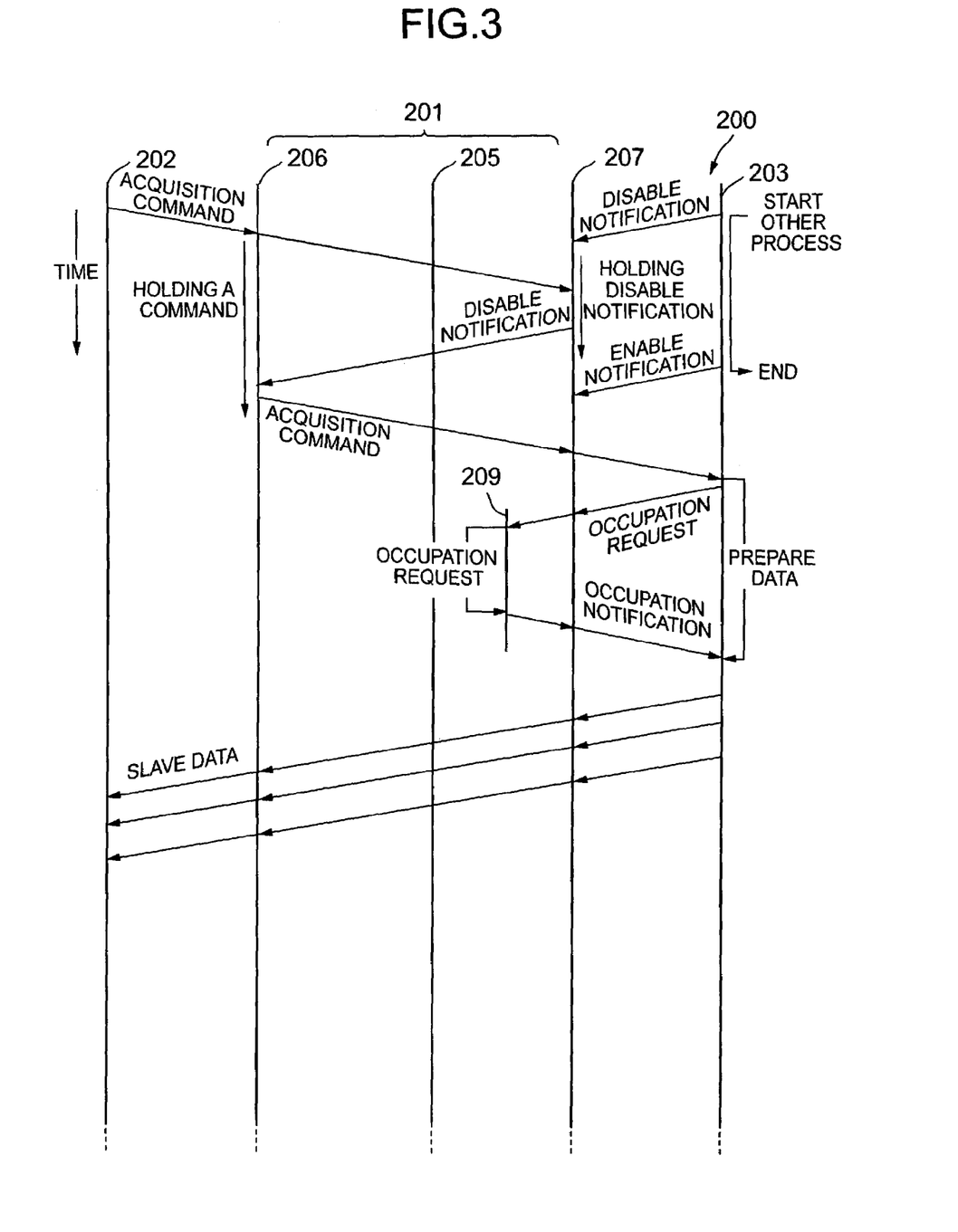
FIG. 3 is a time chart showing the processing during which the master core circuit obtains slave data from the slave core circuit.
Figure 4:
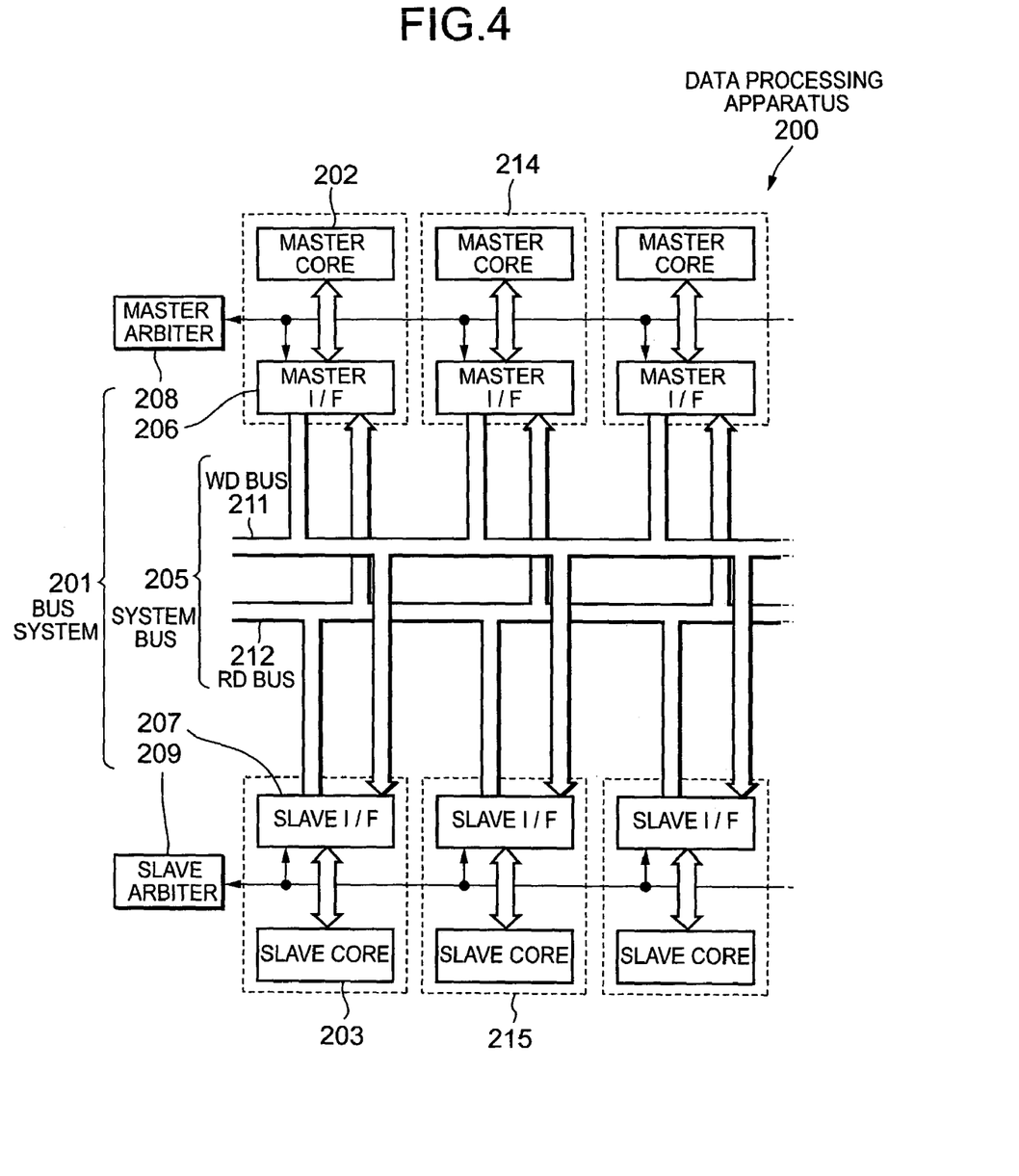
FIG. 4 is a block diagram showing the hardware configuration of a data processing apparatus.

Furthermore, in the data processing apparatus 200 of this embodiment, as is shown in FIG. 3, when the master core circuit 202 wishes to obtain slave data from the slave core circuit 203, it transmits to the master I/F circuit 206 an acquisition command instructing the slave core circuit 203 to prepare and transmit the slave data.

Then, as it does for the transmission command, the master I/F circuit 206 maintains the acquisition command and transmits to the master arbiter 208 a request for permission to occupy the WD bus 211. Upon receiving from the master arbiter 208 notification that occupation of the WD bus 211 is permitted, the master I/F circuit 206,does not transmit this notification to the master core circuit 202; instead, it transmits the stored acquisition command to the slave I/F circuit 207 through the system bus 205.

The acquisition command is thereafter transmitted by the slave I/F circuit 207 to the slave core circuit 203, and when the slave core circuit 203 can not transmit the slave data because it is performing another process, the retry process is performed in the same manner as described above.

When the slave core circuit 203 can transmit the slave data, the slave core circuit 203 prepares the slave data and transmits to the slave I/F circuit 207 a request for permission to occupy the RD bus 212. Since the slave I/F circuit 207 transmits the occupation request to the slave arbiter 209, the slave arbiter 209 permits the slave block 225 that issued the occupation request to occupy the RD bus 212.

The slave core circuit 203 prepares data in parallel while the slave arbiter 209 performs the occupation process. Therefore, by the time the slave arbiter 209 has completed the bus occupation process and the slave I/F circuit 207 has transmitted this notification to the slave core circuit 203, the slave core circuit 203 will have completed the preparation of the data.

When the slave core circuit 203 has received the bus occupation notification and has prepared the slave data, it transmits the prepared slave data through the slave I/F circuit 207, the system bus 205 and the master I/F circuit 206 to the master core circuit 202.

More specifically, when the slave core circuit 203 is a secondary cache to which an external memory (not shown) is connected, the slave data read from the external memory are temporarily stored in the secondary cache and are thereafter transmitted to the master block 214.

Then, upon receiving the acquisition command from the bus system 205, the occupation request is immediately output by the secondary cache to the slave I/F circuit 207. And following this, a check is performed to determine whether the requested slave data are stored in the secondary cache or in the external memory. When the slave data are stored in the secondary cache, they are output to the slave I/F circuit 207 upon the reception of the occupation notification.

When the slave data are stored in the external memory, the reading of data from the external memory is started, and a request from the secondary cache for the cancellation of the bus occupation is transmitted to the slave I/F circuit 207. During the period wherein the data are being read from the external memory, the occupation process for the RD bus 212 is not performed for the secondary cache, and when the reading of data has been completed, an occupation request from the secondary cache is output to the slave I/F circuit 207.

When the slave I/F circuit 207 has transmitted the slave data, the slave I/F circuit 207 transmits to the slave arbiter 209 a cancellation notification for the occupation of the RD bus 211. Therefore, the slave arbiter 209 cancels the occupied state of the RD bus 212.

[Effects of the Embodiment]

In the bus system 201 of this embodiment, as is shown in FIG. 1, the slave I/F circuit 207 does not transmit a command received from the slave core circuit 203, and does not obtain the enable/disable notification from the slave core circuit 203 upon receiving the command. A savings can thus be realized in the time required to perform each of these processes.

Further, the master I/F circuit 206 does not transmit to the master core circuit 202 the disable notification received from the slave block 215, and does not, upon receiving the disable notification, again obtain the transmission command from the master core circuit 202. A savings can thus also be realized in the time required to, perform each of these processes.

Especially since the master I/F circuit 206 performs the retry process at the scheduled time that is received with the disable notification, the retry process can be timely and appropriately performed. Furthermore, when the number of transmissions of the transmission command has reached the upper limit count, the master I/F circuit 206 transmits a transmission error to the master core circuit 202, so that the master core circuit 202 can identify the transmission error without performing the retry process.

In addition, since the disable notification and the reason for the disabling, both of which the slave I/F circuit 207 returns to the master I/F circuit 206, are also transmitted to the master core circuit 202 along with the transmission error, the master core circuit 202 can ascertain the cause of the error and can rapidly perform a predetermined recovery process or interrupt process.

Moreover, as is shown in FIG. 2, when the amount of data held in the master core circuit 202 is less than that represented by a predetermined amount, the master I/F circuit 206 does not transmit to the master core circuit 202 the enable notification received from the slave block 215, nor does it, upon receiving the enable notification, obtain the master data from the master core circuit 202. Therefore, a savings can also be realized in the time required to perform each of these processes. Further, since to control the retry process the master core circuit 202 does not need complicated hardware, the size of the master core circuit 202 can also be reduced.

Especially the master core circuits 202 and the master I/F circuits 206 are individually connected, and the volume available in each master I/F circuit 206 for holding master data corresponds to that available in the master core circuit 202 to which it is connected. Therefore, various amounts of master data can be held without circuit sizes being uselessly increased.

Furthermore, as is shown in FIG. 3, when the master core circuit 202 obtains slave data from the slave core circuit 203, the preparation of data by the slave core circuit 203 and the occupation of the bus by the slave arbiter 209 are performed in parallel. Thus, a savings can be realized in the time required to perform one of these processes.

The data preparation may not be completed when the bus occupation has been terminated, or the bus occupation may not be completed when the data preparation has been terminated. However, even in this case, since the bus occupation and the data preparation are initiated at the same time, the processing time can be reduced.

Especially, as is described above, when internally stored data is to be transmitted, the secondary cache, which is the slave core circuit 203, need only immediately output an occupation request, or when slave data is to be transmitted to the external memory, need only output an occupation request after the data reading has been completed. Therefore, once the RD bus 212 is available it can be immediately occupied, or when it is not currently available, a useless attempt to occupy it will not be made. Thus, the occupation of the bus can be appropriately and efficiently performed.

In addition, the slave core circuit 207 does not request that the slave core circuit 203 determine whether a command received from the block 214 is appropriate, and does not obtain the results of the determination from the slave core circuit 207. Therefore, a savings can be realized in the time required to perform these processes.

Furthermore, since the reason for an error that the slave I/F circuit 207 returns to the master I/F circuit 206 is transmitted to the master core circuit 202 along with the command error, the master core circuit 202 can ascertain the cause of the error and can rapidly transmit an appropriate command.

According to the data processing apparatus 200 of this embodiment, as is described above, the master and slave core circuits 202 and 203 are connected through the master and slave I/F circuits 206 and 207 to the system bus 205, and since the volume of data communication between the core circuits 202 and 203 and the I/F circuits 206 and 207 is minimized, the various processes can be quickly preformed.

[Modification of the Embodiment]

The present invention is not limited to this embodiment, and can be variously modified without departing from the scope of the invention. For example, to simplify the explanation of the embodiment, various commands, various notifications, master data and slave data are uniformly transmitted through the WD and RD buses 211 and 212. However, it is actually appropriate for various binary notifications to be transferred along special high/low lines included in the WD and RD buses 211 and 212.

Furthermore, to simplify the explanation of this embodiment, as is shown in FIG. 3, when the slave core circuit 203 transmits the request for the occupation of the RD bus 212 through the slave I/F circuit 207 to the slave arbiter 209, the slave arbiter 209 returns the occupation notification through the slave I/F circuit 207 to the slave core circuit 203.

However, the slave core circuit 203 that issued the occupation request may output a data preparation end notification to the slave I/F circuit 207 and the slave arbiter 209 may output an occupation notification to the slave I/F circuit 207, and the slave I/F circuit 207, upon receiving the end notification and the occupation notification, may output the occupation notification to the slave core circuit 203.

Further, in this embodiment, the slave I/F circuit 207 holds the enable/disable notification received from the slave core circuit 203. However, the updating to a disable notification, for example, of a default enable notification held by the slave I/F circuit 207, may be performed only when this notification is needed by the slave core circuit 203.

Furthermore, a computer program consonant with a communication protocol is mounted as firmware in the microcomputer master and slave protocol controllers 221 and 251. However, to provide a hardware communication protocol, the master and slave protocol controllers 221 and 251 may be constituted by sequential circuits.

In addition, in this embodiment, the retry set value register 256 of the slave I/F circuit 207 obtains and holds a scheduled time whereat the slave core circuit 203 is recovered from the disabled state to the enabled state. However, a fixed, scheduled time may be set in advance in the retry set value register 256.

Moreover, although in this embodiment the slave I/F circuit 207 receives from the slave core circuit 203, along with the disable notification, the reason for the disabling, the slave I/F circuit 207 may internally generate a reason for the disabling upon the reception of a disable notification from the slave core circuit 203.

In this embodiment, various hardware components are specifically shown; however, so long as the various functions can be provided that implement the present invention, the structures of the hardware components may be variously modified. For example, although in this embodiment the address decoder 264 is incorporated in the slave I/F circuit 207, the address decoder 264 may not be mounted in the slave I/F circuit 207.

In this embodiment, the data processing apparatus has been explained as a hardware entity. However, electronic data for the circuit structure of the data processing apparatus 200 may be generated, and may be stored as computer-readable software on a data storage medium.

Further, a computer program that permits a computer to simulate the operation of the data processing apparatus 200 may be written in the C language and may be stored on a data storage medium (not shown). Thus, a computer may be constituted wherein this computer program and the electronic data are stored on the data storage medium.

The electronic data for the circuit structure of the invention need only be those required for specifying the logical structure of the circuit, and can be, for example, the net list of a circuit apparatus, such as operation description data, RTL (Register Transfer Level) data, gate level data and transistor level data.

The data storage medium for this invention need only be hardware in or on which a computer program that permits a computer to perform various processes has been stored in advance, and can be, for example, a ROM (Read Only Memory) or an HDD (Hard Disc Drive) mounted in the computer, or a CD (Compact Disc)-ROM or an FD (Flexible Disc-cartridge) exchangeably loaded into the computer.

Further, the various means of this invention are not always independent means, and multiple means may be assembled to form one apparatus, or specific means may be a part of another means, or may overlap a part of another means.

Furthermore, "the system bus 205 that at the least serves as a control bus and a data bus" for this invention may not only be a system bus 205 that physically includes a control bus and a data bus, but may also be a system bus 205 that functions as a control bus or as a data bus in a time sharing manner.

According to the bus system of the present invention, since the master and slave I/F circuits perform part of the various processes required for data communication between the master and slave core circuits, data communication between the I/F circuits and the core circuits can be quickly performed while the amount of data required is minimized.

What is claimed is:

1. A bus system comprising:
   a system bus serving, at the least, as a control bus and a data bus; and
   master I/F (Interface) circuits and slave I/F circuits, being connected through said system bus, so that at the least, commands and data are exchanged by master core circuits, connected to said master I/F circuits, and by slave core circuits, connected to said slave I/F circuits;
   wherein said slave I/F circuits include:
      enable/disable notification holding units for respectively holding enable/disable notifications, obtained from said slave core circuits, that indicate whether various process requests, issued by said master core circuits, are capable of being coped with, and
      enable/disable notification transmitters for, upon receiving said commands from said master I/F circuits, returning said enable/disable notifications without transmitting said commands to said slave core circuits; and
   wherein said master I/F circuits include:
      command transmitters for respectively receiving, from said master core circuits, commands for said process requests issued to said slave core circuits and for transmitting said commands to said slave I/F circuits;
      size detectors for employing a transmission command, which instructs said slave core circuits to receive master data transmitted by said master core circuits, to detect the amount of said master data;
      data holding units for temporarily holding said master data for which the detected amount is smaller than a predetermined amount;
      enable notification transfer units for, when said enable notifications are returned from said slave I/F circuits while said master data are not temporarily stored, transmitting said enable notifications to said master core circuits;
      data transfer units for, upon receiving said enable notifications, transferring to said slave core circuits said master data received from said master core circuits; and
      data transmitters for, when said enable notifications are received from said slave I/F circuits while said master data are temporarily stored, transmitting said master data to said slave I/F circuits without transmitting said enable notifications to said master core circuits.

2. A bus system according to claim 1, wherein said master I/F circuits further include:
   command holding units for receiving and holding said commands from said master core circuits;
   command transmitters for transmitting said stored commands to said slave I/F circuits; and
   transfer controllers for, upon receiving said disable notifications from said slave I/F Circuits, permitting said command transmitters to retransmit said stored commands, instead of transmitting said disable notifications to said master core circuits.

3. The bus system according to claim 1, wherein said slave core circuits includes:
   a status determination unit for determining an enable/disable notification that indicates whether process requests issued by each of said master core circuits are capable of being coped with; and
   a status notification transmitter for transmitting said enable/disable notification to said slave I/F circuit.

4. A bus system comprising:
   a system bus serving, at the least, as a control bus and a data bus; and
   master I/F circuits and slave I/F circuits, being connected through said system bus, so that at the least, commands and data are exchanged by master core circuits, connected to said master I/F circuits, and by slave core circuits, connected to said slave I/F circuits;
   wherein said slave I/F circuits include enable/disable notification holding units for respectively holding enable/disable notifications, obtained from said slave core circuits, that indicate whether various process requests, issued by said master core circuits, are capable of being coped with;
   wherein said master I/F circuits include:
      command holding units for receiving, from said master core circuits, commands for said process requests issued to said slave core circuits, and for holding said commands;
      command transmitters for transmitting said commands to said slave I/F circuits;
      transfer controllers for, upon receiving said disable notifications from said slave I/F circuits, permitting said command transmitters to retransmit said stored commands, instead of transmitting said disable notifications to said master core circuits;
      size detectors for employing a transmission command, which instructs said slave core circuits to receive master data transmitted by said master core circuits, to detect the amount of said master data;
      data holding units for temporarily holding said master data for which the detected amount is smaller than a predetermined amount;
      enable notification transfer units for, when said enable notifications are returned from said slave I/F circuits while said master data are not temporarily stored, transmitting said enable notifications to said master core circuits;
      data transfer units for, upon receiving said enable notifications, transferring to said slave core circuits said master data received from said master core circuits; and
      data transmitters for, when said enable notifications are received from said slave I/F circuits while said master data are temporarily stored, transmitting said master data to said slave I/F circuits without transmitting said enable notifications to said master core circuits.

5. A bus system according to claim 4, wherein:
said slave I/F circuits include time notification units for obtaining, from said slave core circuits, scheduled times whereat said slave core circuits are recovered to the enabled state, and for returning said scheduled times, along with said disable notifications, to said master I/F circuits; and
said transfer controllers do not transmit to said master core circuits said disable notifications and said scheduled times received from said slave I/F circuits, but permit said command transmitters to retransmit said commands when a time period represented by said scheduled time has elapsed.

6. A bus system according to one of claim 5, wherein said master I/F circuits include:
upper limit holding units for obtaining, from said master core circuits, an upper limit for repetitive transmissions of said commands, and for holding said upper limit;
count accumulation units for accumulating the number of transmissions of said commands; and
error transmitters for notifying said master core circuits of a transmission error when said number of transmissions reaches said upper limit.

7. A bus system according to claim 6, wherein said slave I/F circuits include reason returning units for returning to said master I/F circuits, along with said disable notifications, reasons for said disabling, and wherein said master I/F circuits include cause transmitters for transmitting to said master core circuits, along with said transmission error, said disable notifications and said reasons for said disabling.

8. A bus system comprising:
a system bus serving, at the least, as a control bus and a data bus; and
master I/F circuits and slave I/F circuits, being connected through said system bus, so that at the least, commands and data are exchanged by master core circuits, connected to said master I/F circuits, and by slave core circuits, connected to said slave I/F circuits;
wherein said master I/F circuits include:
size detectors for employing a transmission command, which instructs said slave core circuits to receive master data transmitted by said master core circuits, to detect the amount of said master data;
data holding units for temporarily holding said master data for which the detected amount is smaller than a predetermined amount;
enable notification transfer units for, when said enable notifications are returned from said slave I/F circuits while said master data are not temporarily stored, transmitting said enable notifications to said master core circuits;
data transfer units for, upon receiving said enable notifications, transferring to said slave core circuits said master data received from said master core circuits; and
data transmitters for, when said enable notifications are received from said slave I/F circuits while said master data are temporarily stored, transmitting said master data to said slave I/F circuits without transmitting said enable notifications to said master core circuits.

9. A bus system according to claim 8, wherein said master I/F circuits are respectively provided for said master core circuits; and wherein the volumes of said data holding units of said master I/F circuits correspond to those of said master core circuits to which said master I/F circuits are connected.

10. A bus system according to claim 9, wherein said slave I/F circuits include condition holding units for obtaining, from said slave core circuits, acceptance conditions for receiving commands from said master core circuits;
command determination units for determining whether said commands received from said master core circuits correspond to said acceptance conditions; and
error transmitters for, when said commands do not correspond to said acceptance conditions, returning command errors to said master I/F circuits without transmitting said commands to said slave core circuits.

11. A bus system comprising:
a system bus serving, at the least, as a control bus and a data bus;
master I/F circuits and slave I/F circuits, being connected through said system bus, so that at the least, commands and data are exchanged by master core circuits, connected to said master I/F circuits, and by slave core circuits, connected to said slave I/F circuits; and
wherein said master I/F circuits include:
size detectors for employing a transmission command, which instructs said slave core circuits to receive master data transmitted by said master core circuits, to detect the amount of said master data;
data holding units for temporarily holding said master data for which the detected amount is smaller than a predetermined amount;
enable notification transfer units for, when said enable notifications are returned from said slave I/F circuits while said master data are not temporarily stored, transmitting said enable notifications to said master core circuits;
data transfer units for, upon receiving said enable notifications, transferring to said slave core circuits said master data received from said master core circuits; and
data transmitters for, when said enable notifications are received from said slave I/F circuits while said master data are temporarily stored, transmitting said master data to said slave I/F circuits without transmitting said enable notifications to said master core circuits.

12. The bus system as claimed in claim 11, wherein said slave I/F circuits include:
command receivers for receiving, from said master core circuits, acquisition commands for instructing the output of said slave data, and for transmitting said acquisition commands to said slave core circuits, and
occupation requesting units for, before said slave data are received from said slave core circuits that issued said acquisition commands, receiving requests for the occupation of said system bus, and for transmitting said requests to said occupation controllers.

13. The bus system as claimed in claim 12, further comprising an occupation controller for permitting said master core circuits to occupy said system bus when said master core circuits obtain slave data from said slave core circuits.

14. The bus system according to claim 11, wherein said slave core circuits includes:
a data preparation unit for preparing said slave data in accordance with an acquisition command that is received; and
a prior request issuing unit for, when a predetermined condition has been satisfied during the preparation of said slave data, transmitting said occupation request to said slave I/F circuit.

* * * * *